United States Patent
Takada (10) Patent No.: US 9,065,131 B2
(45) Date of Patent: Jun. 23, 2015

(54) ELECTROLYTE INJECTION DEVICE AND ELECTROLYTE INJECTION METHOD

(75) Inventor: Koichi Takada, Atsugi (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 342 days.

(21) Appl. No.: 13/639,719

(22) PCT Filed: Apr. 7, 2011

(86) PCT No.: PCT/JP2011/058784
§ 371 (c)(1),
(2), (4) Date: Oct. 5, 2012

(87) PCT Pub. No.: WO2011/126068
PCT Pub. Date: Oct. 13, 2011

(65) Prior Publication Data
US 2013/0029186 A1  Jan. 31, 2013

(30) Foreign Application Priority Data
Apr. 7, 2010  (JP) ................... 2010-088696

(51) Int. Cl.
| | |
|---|---|
| *H01M 2/36* | (2006.01) |
| *H01M 2/38* | (2006.01) |
| *H01M 14/00* | (2006.01) |
| H01M 10/0585 | (2010.01) |
| H01M 10/0525 | (2010.01) |

(52) U.S. Cl.
CPC .......... *H01M 2/361* (2013.01); *H01M 2300/00* (2013.01); *H01M 2/38* (2013.01); *H01M 14/00* (2013.01); *H01M 2/36* (2013.01); *H01M 10/0585* (2013.01); *H01M 10/0525* (2013.01)

(58) Field of Classification Search
CPC ......... H01M 2/361; H01M 2/36; H01M 2/38; H01M 14/00; H01M 2300/00
USPC .................. 429/51, 52, 71, 82; 141/32, 61
See application file for complete search history.

(56) References Cited

U.S. PATENT DOCUMENTS

| | | | | |
|---|---|---|---|---|
| 5,487,417 | A | * | 1/1996 | Kasahara et al. ............... 141/32 |
| 6,497,976 | B1 | * | 12/2002 | Morizane ........................ 429/71 |
| 6,588,461 | B2 | * | 7/2003 | Morizane ........................ 141/61 |
| 2005/0244705 | A1 | * | 11/2005 | Cherng et al. .................. 429/52 |

FOREIGN PATENT DOCUMENTS

| | | |
|---|---|---|
| CN | 201243051 Y | 5/2009 |
| DE | 100 29 532 A1 | 1/2002 |
| JP | 2-148572 A | 6/1990 |
| JP | 9-102443 | 4/1997 |
| JP | 2000-340215 A | 12/2000 |
| JP | 2001-317682 A | 11/2001 |
| JP | 2003-151532 A | 5/2003 |
| JP | 2004-327161 A | 11/2004 |
| JP | 2007-173063 A | 7/2007 |
| WO | WO 02/19444 A2 | 3/2002 |

OTHER PUBLICATIONS

Machine Translation of: JP 2004/327161A, Miyahisa et al., Nov. 18, 2004.*
Chinese Office Action, May 30, 2014, 7 pages.
European Search Report, Oct. 10, 2013, 4 pages.

* cited by examiner

*Primary Examiner* — Kenneth Douyette
(74) *Attorney, Agent, or Firm* — Foley & Lardner LLP (57) ABSTRACT

A battery case is disposed in a decompression chamber. An electrolyte in an aeration tank is injected into the battery case in the decompression chamber using a liquid injection nozzle. By exposing the electrolyte to an ambient pressure in the decompression chamber within the aeration tank before supplying the electrolyte to the liquid injection nozzle, a pressure of the electrolyte is regulated to a pressure in the decompression chamber, and gas molecules in the electrolyte are separated therefrom. By providing the aeration tank, an efficiency with which the gas molecules are separated from the electrolyte is improved, and as a result, the electrolyte is injected into the battery case smoothly.

6 Claims, 5 Drawing Sheets

ELECTROLYTE INJECTION DEVICE AND ELECTROLYTE INJECTION METHOD

FIELD OF THE INVENTION

This invention relates to injection of an electrolyte into a battery case.

BACKGROUND OF THE INVENTION

JP09-102443A, published by the Japan Patent Office in 1997, discloses an electrolyte injection method which, in order to inject an electrolyte into a battery case efficiently, promotes infiltration of the electrolyte into gaps between electrode groups by injecting the electrolyte into the battery case in a decompressed atmosphere.

SUMMARY OF THE INVENTION

In a decompressed atmosphere, a volume of gas dissolved in the electrolyte expands rapidly such that air bubbles form easily. Therefore, the electrolyte must be injected slowly to prevent the air bubbles formed therein from causing the electrolyte to overflow the battery case.

In other words, although the prior art promotes infiltration of the electrolyte into the gaps between the electrode groups, it is not always possible to reduce an injection time.

It is therefore an object of this invention to reduce a time required to inject an electrolyte into a battery case reliably.

In order to achieve this object, an electrolyte injection device according to this invention comprises a sealed decompression chamber, and a liquid injection nozzle that injects the electrolyte into the battery case disposed in the decompression chamber. The electrolyte injection device further comprises an aeration tank that exposes the electrolyte supplied to the liquid injection nozzle to a pressure in the decompression chamber.

The details as well as other features and advantages of this invention are set forth in the remainder of the specification and are shown in the accompanying drawings.

DESCRIPTION OF THE PREFERRED EMBODIMENTS

Figure 1:
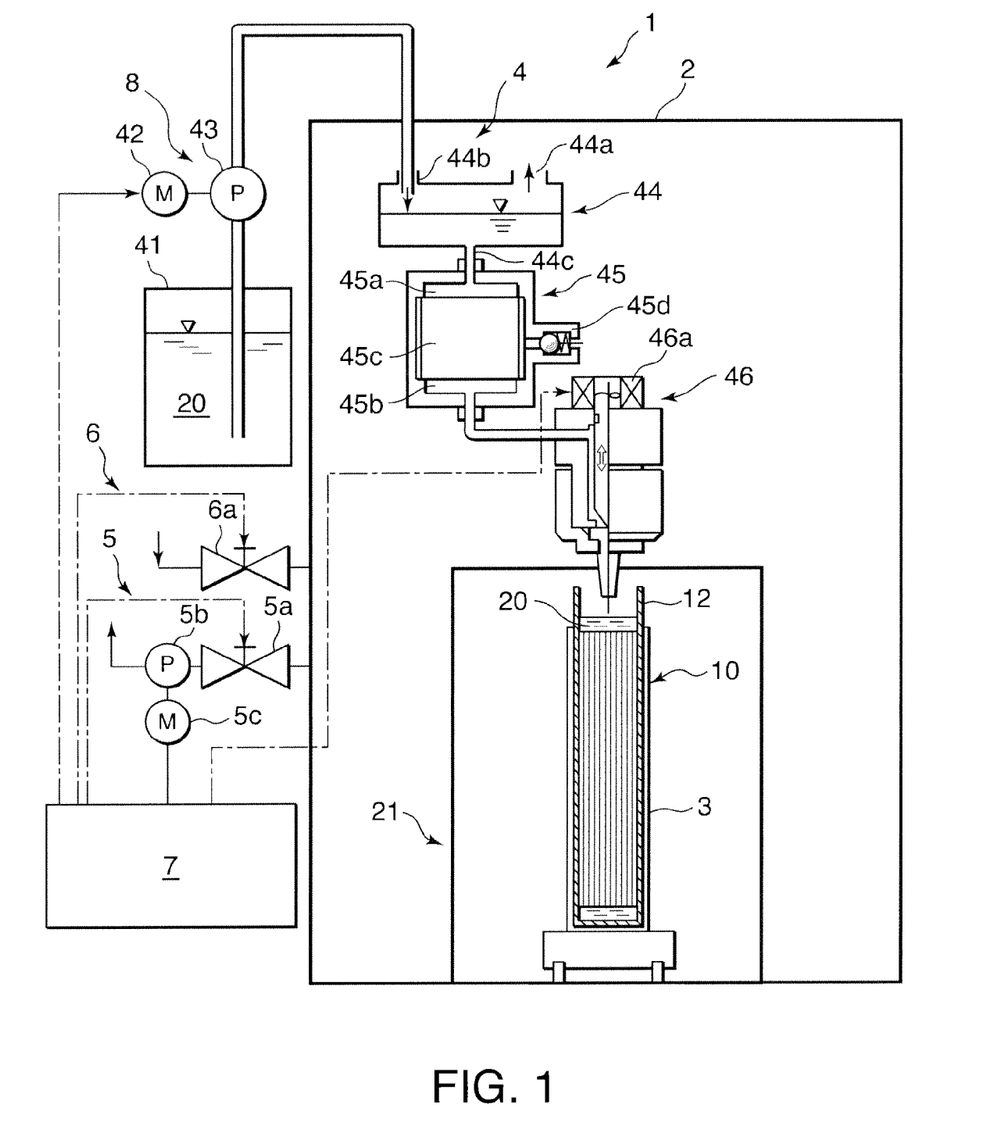
FIG. 1 is a schematic diagram of an electrolyte injection device according to this invention.

Referring to FIG. 1 of the drawings, an electrolyte injection device 1 injects an electrolyte 20 into a battery case 12 of a lithium ion secondary battery 10 held by a holding jig 3.

The electrolyte injection device 1 comprises a decompression chamber 2 formed from a sealed container, a decompression line 5 that decompresses an interior of the decompression chamber 2, an atmospheric air introduction line 6 that returns the interior of the decompression chamber 2 to atmospheric pressure from a decompressed condition, and an electrolyte supply line 8 that supplies the electrolyte 20 to the decompression chamber 2. The electrolyte injection device 1 also comprises a liquid injection mechanism 4 that is provided in the decompression chamber 2 to decompress the electrolyte 20 supplied from the electrolyte supply line 8 and inject the decompressed electrolyte 20 into the battery case 12. Further, the electrolyte injection device 1 comprises a control device 7 that is provided on an outside of the decompression chamber 2 to control the decompression line 5, the atmospheric air introduction line 6, the electrolyte supply line 8, and the liquid injection mechanism 4.

Figure 2:
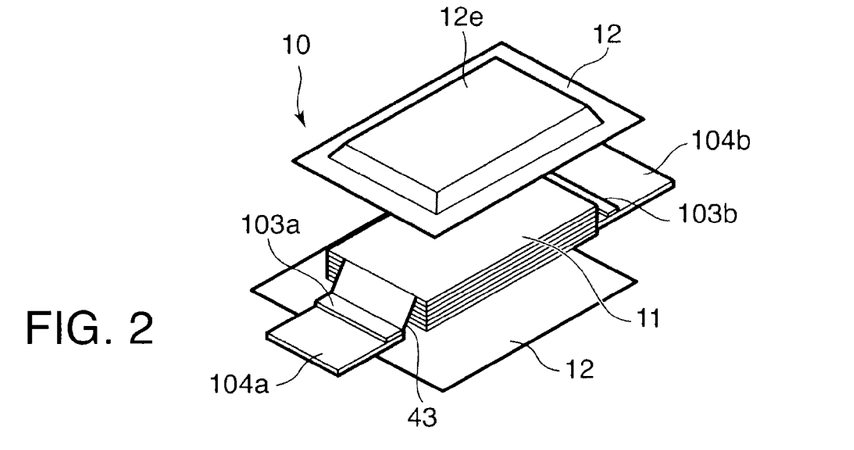
FIG. 2 is an exploded perspective view of a lithium ion secondary battery.

Referring to FIG. 2, the lithium ion secondary battery 10 comprises a battery main body 11 provided with a positive electrode collector portion 103a and a negative electrode collector portion 103b, a battery case 12 that is formed from laminate film and houses the battery main body 11, a positive electrode tab 104a electrically connected to the positive electrode collector portion 103a, and a negative electrode tab 104b electrically connected to the negative electrode collector portion 103b.

Figure 3:
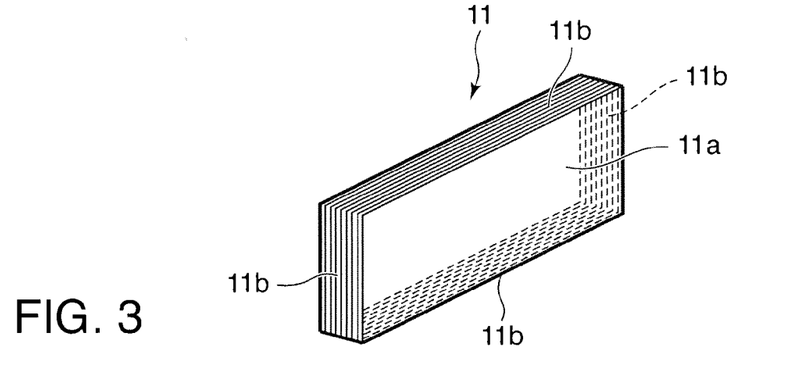
FIG. 3 is a perspective view of a battery main body.

Referring to FIG. 3, the battery main body 11 is constituted by a laminated body of cells formed by laminating a positive electrode plate and a negative electrode plate via a separator. In the following description, an end surface of the battery main body 11 relative to a cell lamination direction will be referred to as a laminated end surface 11a, and an outer peripheral surface of the battery main body 11 excluding the laminated end surface 11a will be referred to as a laminated side face 11b.

Referring again to FIG. 2, the positive electrode plate is constituted by aluminum foil coated onto a positive electrode. The negative electrode plate is constituted by copper foil coated onto a negative electrode. A metallic film piece 43 not coated with an electrode material, which is drawn to the outside from a cell lamination region, is connected respectively to the positive electrode plate and the negative electrode plate of each cell.

The positive electrode collector portion 103a is formed by welding together the metallic film pieces 43 of the positive electrode plates in all of the cells through ultrasonic welding. The positive electrode tab 104a is likewise welded to the positive electrode collector portion 103a by ultrasonic welding.

The negative electrode collector portion 103b is formed by welding together the metallic film pieces 43 of the negative electrode plates in all of the cells through ultrasonic welding. The negative electrode tab 104b is likewise welded to the negative electrode collector portion 103b by ultrasonic welding.

In the lithium ion secondary battery 10, discharge from each cell and storage in each cell are performed via the positive electrode tab 104a and the negative electrode tab 104b.

The battery case 12 is constituted by two laminate films. The laminate film is constituted by a laminated body including a thermally adhesive resin layer having a thermal adhesion property, a metallic layer, and a protection layer. The laminate film is used in a condition where the thermally adhesive resin layer opposes the battery main body 11. Polypropylene (PP) is used for the thermally adhesive resin layer.

A recessed portion 12e for housing the battery main body 11 is formed in advance in one of the laminate films. The battery case 12 is formed by adhering the two laminate films to each other with the battery main body 11 housed in the recessed portion 12e, and then thermally welding the four sides. It should be noted, however, that first, three sides are thermally welded with the battery main body 11 housed in the recessed portion 12e, and a remaining side is thermally welded after injecting an electrolyte into the battery case 12 through an opening portion in the remaining side.

Instead of forming the recessed portion 12e in the laminate film, two flat laminate films may be adhered to each other so as to envelop the battery main body 11, whereby the battery main body 11 is housed in a space formed by deformation of the laminate films.

Figure 4:
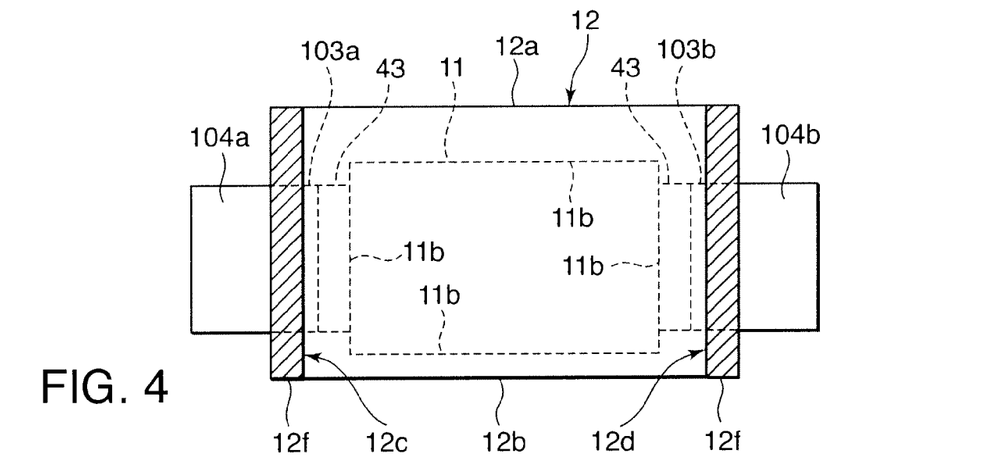
FIG. 4 is a side view of the lithium ion secondary battery.

Referring to FIG. 4, another configuration of the battery case 12 will be described.

Here, a single laminate film is folded in half so as to envelop the battery main body 11. In this condition, a bottom side 12b of the battery case 12 serves as a folded back side of the laminate film. An adhesion portion 12f in which contacting parts of the laminate film are thermally welded to each other is provided on two sides 12c and 12d on left and right sides of the figure, from among the other three sides, and as a result, a bag-shaped battery case 12 is formed. A remaining side 12a of the battery case 12, which corresponds to an upper end in the figure, is left open.

The electrolyte 20 is injected into the battery case 12 through the opening portion in the side 12a toward the interior of the battery case 12. Following injection of the electrolyte 20, the battery case 12 is sealed by thermally welding the side 12a.

The material of the battery case 12 is not limited to laminate film. The battery case 12 may be made of metal.

Referring again to FIG. 1, the electrolyte 20 is constituted by an electrolyte having, for example, 1 mol/liter of lithium hexafluorophosphate (LiPF6) or lithium tetrafluoroborate (LiBF4) as a supporting electrolyte, and propylene carbonate and ethylene carbonate mixed at a mass ratio of 50:50 as a mixed solvent.

The decompression chamber 2 comprises a door 21. The door 21 is provided to introduce the battery case 12 housing the batter main body 11 into the decompression chamber 2 together with the holding jig 3 and remove the battery case 12 from the decompression chamber 2 together with the holding jig 3 following injection of the electrolyte. To avoid misunderstanding, it should be noted that a rectangle indicated by the reference numeral 21 in the figure denotes a door provided in a wall surface of the decompression chamber 2 behind the battery case 12 rather than a container covering the battery case 12. An introduction path and a removal path for the battery case 12 are provided on the outside of the door 21. The door 21 is opened and closed when the interior of the decompression chamber 2 is at atmospheric pressure. When closed, the door 21 maintains the interior of the decompression chamber 2 in an airtight condition.

The battery case 12 is introduced into the decompression chamber 2, filled with the electrolyte in the decompression chamber 2, and removed from the decompression chamber 2 while held by the holding jig 3. The holding jig 3 sandwiches two surfaces of the battery case 12 covering the laminated end surfaces 11a of the battery main body 11 and holds the battery case 12 such that the opening portion in the side 12a is oriented upward.

The decompression line 5 comprises a vacuum pump 5b driven by an electric motor 5c, and a valve 5a that connects the vacuum pump 5b to the decompression chamber 2. By operating the vacuum pump 5b in a condition where the valve 5a is open, the decompression line 5 decompresses the interior of the decompression chamber 2.

The atmospheric air introduction line 6 comprises a valve 6a that connects the decompression chamber 2 to the atmosphere. By opening the valve 6a such that atmospheric air is introduced into the decompressed decompression chamber 2, the atmospheric air introduction line 6 raises an internal pressure of the decompression chamber 2 from a vacuum condition to an atmospheric pressure condition. It should be noted that the valve 6a may connect the decompression chamber 2 to a storage tank storing dry air or an inert gas instead of connecting the decompression chamber 2 to the atmosphere.

The electrolyte supply line 8 comprises a storage tank 41 storing the electrolyte 20, a feed pump 43 that pressurizes the electrolyte 20 in the storage tank 41 and supplies the pressurized electrolyte 20 into the decompression chamber 2, and an electric motor 42 that drives the feed pump 43.

The liquid injection mechanism 4 provided in the decompression chamber 2 comprises an aeration tank 44, a degassing module 45, and a liquid injection nozzle 46.

Figure 5:
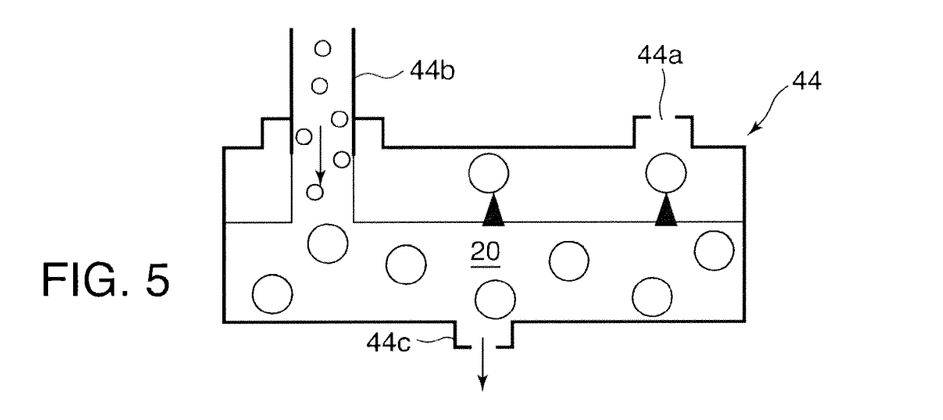
FIG. 5 is a schematic longitudinal sectional view of an aeration tank provided in the electrolyte injection device.

Referring to FIG. 5, the aeration tank 44 removes air from the electrolyte 20 supplied to the decompression chamber 2 from the feed pump 43 by exposing the electrolyte 20 to the atmosphere in the decompression chamber 2. For this purpose, the aeration tank 44 comprises an inflow port 44b through which the electrolyte 20 from the feed pump 43 flows in, and an opening portion 44a formed in an upper end of the decompression chamber 2. The electrolyte 20 supplied from the feed pump 43 is stored temporarily in the aeration tank 44. As a result, an inside of the aeration tank 44 is separated into a liquid phase below a liquid level of the electrolyte 20 and a gas phase above the liquid level. An outflow port 44c that communicates with the degassing module 45 is formed in a position of the aeration tank 44 facing the liquid phase.

The electrolyte 20 that flows into the aeration tank 44 through the inflow port 44b is exposed to the atmosphere in the decompression chamber 2, which is introduced into the aeration tank 44 above the liquid phase through the opening portion 44a, via the liquid level in the aeration tank 44. As a result, a liquid pressure of the electrolyte 20 is reduced until equal to the pressure of the atmosphere in the decompression chamber 2. In other words, when the decompression chamber 2 is at atmospheric pressure, the electrolyte 20 in the aeration tank 44 also reaches atmospheric pressure, and when the decompression chamber 2 is at negative pressure, the electrolyte 20 in the aeration tank 44 also reaches negative pressure.

A volume of the aeration tank 44 is preferably set to be sufficient to enable storage of an amount of electrolyte to be injected into the battery case 12. The electrolyte 20 is supplied from the feed pump 43 into the aeration tank 44 every time the battery case 12 is introduced into the decompression chamber 2, for example.

Referring again to FIG. 1, the degassing module 45 is connected to the outflow port 44c of the aeration tank 44 to perform further gas-liquid separation using a gas permeable membrane on the electrolyte 20 subjected to air removal and pressure regulation in the aeration tank 44.

Figure 6:
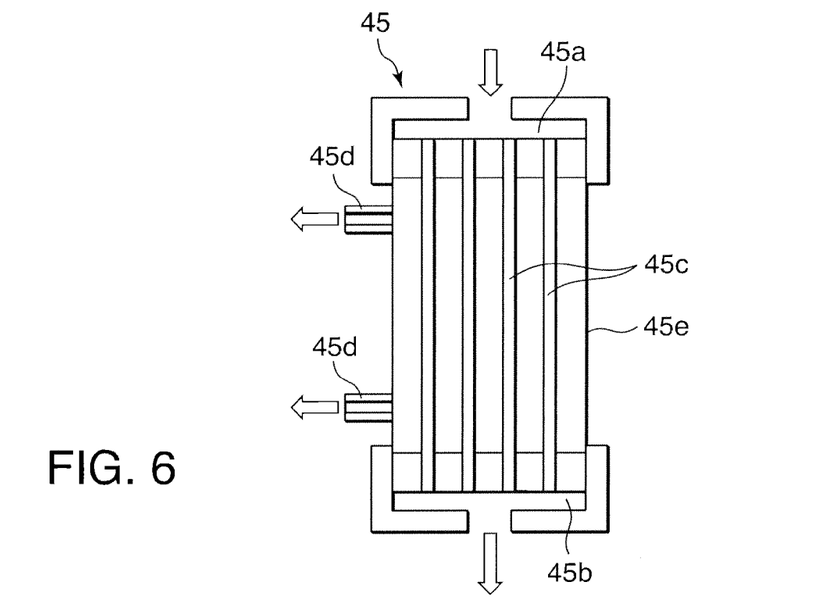
FIG. 6 is a schematic longitudinal sectional view of a degassing module provided in the electrolyte injection device.

Referring to FIG. 6, the degassing module 45 comprises an inlet chamber 45a that communicates with the outflow port 44c of the aeration tank 44, an outlet chamber 45b, and a plurality of degassing pipes 45c that connect the inlet chamber 45a and the outlet chamber 45b. The degassing module 45 also comprises an airtight chamber 45e housing the plurality of degassing pipes 45c, and a check valve 45d that connects the airtight chamber 45e to the atmosphere in the decompression chamber 2. The check valve 45d allows air to flow out of the airtight chamber 45e into the decompression chamber 2 but prevents air from flowing into the airtight chamber 45e from the decompression chamber 2. An internal pressure of the airtight chamber 45e is maintained at or below the pressure in the decompression chamber 2 at all times by the check valve 45d. The airtight chamber 45e is maintained in a decompressed condition even when the pressure in the decompression chamber 2 is raised to atmospheric pressure by the atmospheric air introduction line 6.

The degassing pipes 45c are constituted by resin hollow fiber gas permeable membranes. The hollow fiber gas permeable membranes are non-porous and have a property for transmitting small-sized, highly motile gas molecules.

Figure 7:
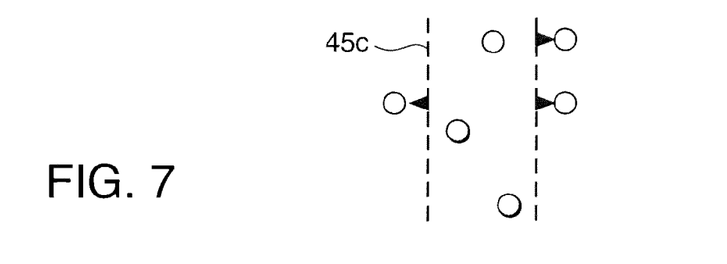
FIG. 7 is a partial longitudinal sectional view of a degassing pipe, illustrating a degassing process performed in the degassing module.

Referring to FIG. 7, in the electrolyte traveling from the inlet chamber 45a toward the outlet chamber 45b through the degassing pipes 45c disposed in the constantly decompressed airtight chamber 45e, small-sized, highly motile dissolved gas molecules contained in the liquid are diffused from the liquid toward wall surfaces of the degassing pipes 45c. The diffused gas molecules gather near an inner peripheral surface of the gas permeable membranes in accordance with Fick's law. The gas molecules are then taken into the gas permeable membranes in accordance with Henry's law, move through the gas permeable membranes, and are discharged to the outside of the gas permeable membranes.

Referring again to FIG. 1, the liquid injection nozzle 46 is disposed above the opening portion of the battery case 12 held in a predetermined position of the decompression chamber 2 by the holding jig 3, so as to face thereto. The liquid injection nozzle 46 is connected to the outlet chamber 45b of the degassing module 45 via a solenoid valve 46a. The liquid injection nozzle 46 injects the degassed electrolyte 20 supplied from the degassing module 45 into the interior of the battery case 12 through the opening portion in accordance with excitation of the solenoid valve 46a.

Opening/closing of the valve 5a and operations of the electric motor 5c on the decompression line 5, opening/closing of the valve 6a on the atmospheric air introduction line 6, operations of the electric motor 42 on the electrolyte supply line 8, and opening/closing of the solenoid valve 46a provided in the liquid injection nozzle 46 are controlled by a controller 7 provided on the outside of the decompression chamber 2 via signal circuits. The controller 7 is constituted by a microcomputer including a central processing unit (CPU), a read-only memory (ROM), a random access memory (RAM), and an input/output interface (I/O interface). The controller 7 may be constituted by a plurality of microcomputers.

Next, referring to FIGS. 8A-8G, a process for injecting the electrolyte 20 into the battery case 12 using the electrolyte injection device 1 will be described.

Figure 8A:
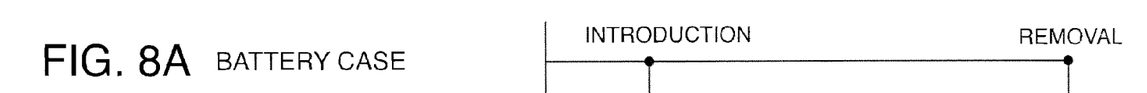
FIGS. 8A-8G are timing charts illustrating an electrolyte injection operation performed by the electrolyte injection device.
Figures 8B, 8C, 8D:
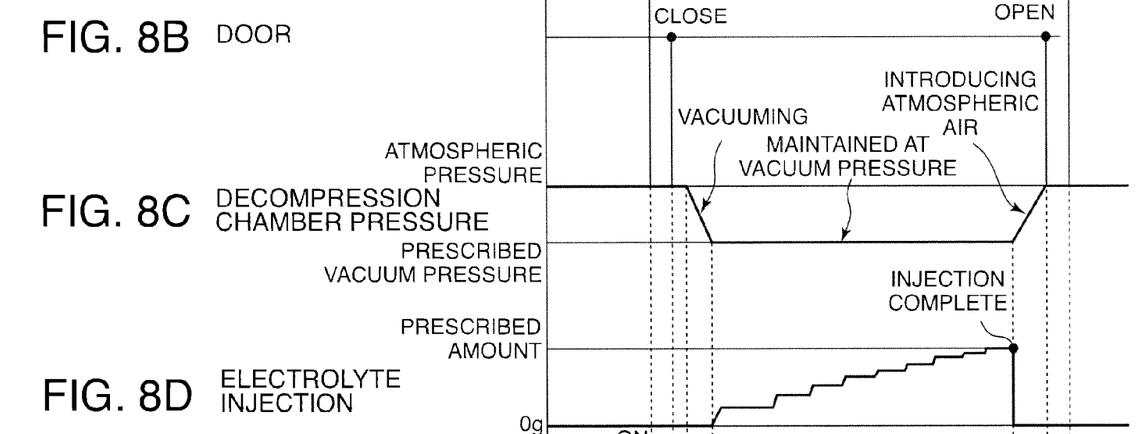
Figures 8E, 8F:
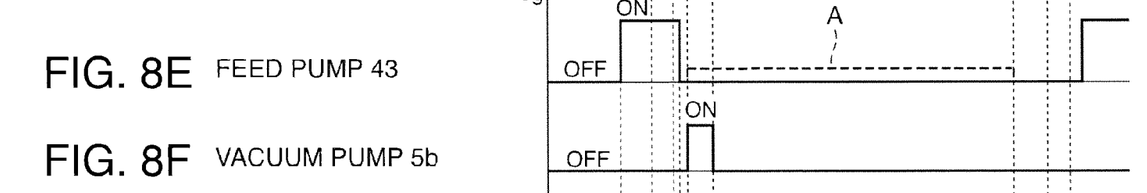
Figure 8G:
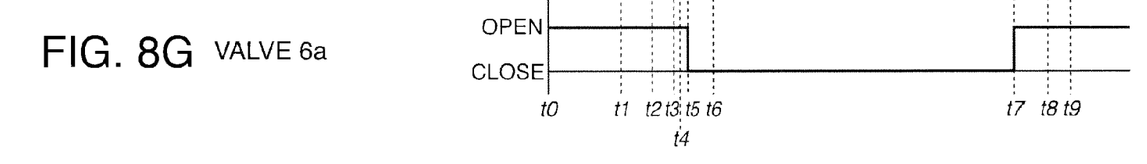

In a wait period extending from a time t0 to a time t1, the valve 6a of the atmospheric air introduction line 6 is opened, as shown in FIG. 8G, such that the interior of the decompression chamber 2 is open to atmospheric pressure. As shown in FIG. 8B, the door 21 is open, and as shown in FIGS. 8E and 8F, the feed pump 43 of the electrolyte supply line 8 and the vacuum pump 5b of the decompression line 5 are inoperative.

At the time t1, an operation to inject the electrolyte 20 into the battery case 12 using the electrolyte injection device 1 is started. The controller 7 operates the feed pump 43, as shown in FIG. 8E, by operating the electric motor 42 on the electrolyte supply line 8, and as a result, the electrolyte 20 in the storage tank 41 is supplied to the aeration tank 44.

At a time t2, as shown in FIG. 8A, the battery case 12 held by the holding jig 3 is introduced into the decompression chamber 2 through the door 21. At a time t3, as shown in FIG. 8B, the door 21 is closed.

At a time t4, as shown in FIG. 8E, the controller 7 stops supplying the electrolyte 20 to the aeration tank 44 from the electrolyte supply line 8. The electrolyte 20 supplied to the aeration tank 44 is decompressed from a pressurized condition obtained by adding the pressurization applied by the feed pump 43 to the atmospheric pressure in the storage tank 41 to atmospheric pressure by being exposed to the atmosphere of the decompression chamber 2 in the aeration tank 44, and as a result, a part of the gas molecules dissolved in the electrolyte 20 expand and separate from the electrolyte 20 as air bubbles, as shown in FIG. 5.

Referring again to FIGS. 8A-8G, at a time t5, the controller 7 closes the valve 6a on the atmospheric air introduction line 6, as shown in FIG. 8G. Simultaneously, the controller 7 opens the valve 5a on the decompression line 5 to start an operation of the electric motor 5c. As a result, as shown in FIG. 8F, the vacuum pump 5b becomes operative. Accordingly, as shown in FIG. 8C, the pressure in the decompression chamber 2 is reduced from atmospheric pressure.

When the pressure in the decompression chamber 2 falls to a prescribed vacuum pressure at a time t6, the controller 7 stops the operation of the electric motor 5c, and as shown in FIG. 8F, stops the operation of the vacuum pump 5b. Further, the controller 7 closes the valve 5a on the decompression line 5. Thereafter, the decompression chamber 2 is maintained at vacuum pressure. The interiors of the degassing module 45 and the battery case 12 are also maintained at vacuum pressure.

In the aeration tank 44, the electrolyte 20 is exposed to the vacuum pressure so as to be further decompressed. As a result, a density of the dissolved gas molecules contained in the electrolyte 20 decreases, enabling the gas molecules to move through the liquid more easily. In this environment, the gas molecules expand in volume to form air bubbles that rise through the liquid rapidly to reach the liquid level of the electrolyte 20, and are released into an upper portion space of the aeration tank 44. By decompressing the decompression chamber 2 in this manner, gas-liquid separation of the electrolyte 20 in the aeration tank 44 is promoted.

At the time t6, the controller 7 opens the solenoid valve 46a and at the same time stops the operation of the vacuum pump 5b. As a result, as shown in FIG. 8D, injection of the electrolyte 20 into the battery case 12 from the liquid injection nozzle 46 begins. As the liquid injection nozzle 46 starts to inject the electrolyte 20, the electrolyte 20 in the aeration tank 44, from which the dissolved gas molecules have been sufficiently released, is supplied to the liquid injection nozzle 46 via the degassing module 45. As the electrolyte 20 passes through the degassing module 45, the remaining dissolved gas molecules in the liquid are further separated from the electrolyte 20. As a result, the electrolyte 20 is supplied to the liquid injection nozzle 46 in a condition where gas molecules have been substantially completely removed therefrom.

The electrolyte 20 injected into the battery case 12 first flows into a space between the battery main body 11 and the right and left sides 12d and 12c from a space above the battery main body 11 shown in FIG. 4, and is then filled into a gap between the battery main body 11 and the bottom side 12b of the battery case 12. Thus, the electrolyte 20 injected into the battery case 12 infiltrates the interior of the battery main body 11 from the periphery of the battery main body 11.

Gas molecules are substantially completely removed from the electrolyte 20 injected into the battery case 12. Further, the pressure of the electrolyte 20 is regulated in advance in the aeration tank 44 to be equal to the vacuum pressure in the decompression chamber 2.

Therefore, in the electrolyte 20 injected into the battery case 12, a situation in which the dissolved gas molecules existing in the liquid expand rapidly, causing the liquid to scatter, does not occur, and the electrolyte 20 infiltrates the interior of the battery main body 11 quickly.

The controller 7 synchronizes a liquid injection speed of the liquid injection nozzle 46 with an infiltration speed of the electrolyte 20 into the battery main body 11. For this purpose, the controller 7 performs liquid injection intermittently by closing the solenoid valve 46a for a predetermined time when a fixed amount of liquid injection is complete and reopening the solenoid valve 46a when the predetermined time has elapsed. As a result, as shown in FIG. 8D, an amount of the electrolyte 20 in the battery case 12 increases in stages. This control is preferably performed to prevent the electrolyte 20 from being injected at a higher speed than the infiltration speed into the battery main body 11 such that the electrolyte 20 overflows the battery case 12.

At a time t7, as shown in FIG. 8D, the amount of the electrolyte 20 in the battery case 12 reaches a prescribed amount. By injecting the electrolyte 20 into the battery case 12 at a reduced pressure and removing the dissolved gas molecules from the electrolyte 20, a period from the start of injection of the electrolyte 20 by the liquid injection nozzle 46 at the time t6 to the end of injection of the electrolyte 20 by the liquid injection nozzle 46 at the time t7 can be shortened.

At the time t7, the controller 7 closes the solenoid valve 46a, and as shown in FIG. 8G, opens the valve 6a on the atmospheric air introduction line 6 to start introducing atmospheric air into the decompression chamber 2.

As a result, as shown in FIG. 8C, the pressure in the decompression chamber 2 rises toward atmospheric pressure. In spite of the pressure increase in the decompression chamber 2, the pressure in the interior of the battery main body 11 in the battery case 12 does not rise immediately. A resulting pressure incline accelerates infiltration of the electrolyte 20 into the interior of the battery main body 11 such that the operation for filling the electrolyte 20 into the battery main body 11 is completed in a short time.

When the pressure in the decompression chamber 2 reaches atmospheric pressure at a time t8, the door 21 is opened, as shown in FIG. 8B. At a time t9, as shown in FIG. 8A, the battery case 12 is removed to the outside of the decompression chamber 2 through the door 21 while held by the holding jig 3. Thereafter, a process for injecting the electrolyte 20 into another battery case 12 is resumed in the decompression chamber 2.

The battery case 12 removed from the decompression chamber 12 is sealed by thermally adhering the opening portion, and as a result, assembly of the lithium ion secondary battery is complete.

According to the electrolyte injection device 1 described above, the electrolyte 20 is decompressed by exposing the electrolyte 20 to the atmosphere in the decompression chamber 2 via the aeration tank 44. As a result, the density of the dissolved gas molecules in the electrolyte 20 decreases, enabling the gas molecules to move through the liquid more easily. The gas molecules expand in volume to form air bubbles that rise through the liquid rapidly to reach the liquid level of the electrolyte 20, and are released into the upper portion space of the aeration tank 44. By providing the aeration tank 44 that exposes the electrolyte 20 to the atmosphere in the decompression chamber 2 in this manner, gas-liquid separation is promoted in the electrolyte 20, leading to an improvement in degassing efficiency. As a result, the time required to inject the electrolyte 20 into the battery case 12 can be reduced.

Further, by combining the aeration tank 44 with the degassing module 45 employing gas permeable membranes, the electrolyte 20 can be degassed completely.

As a result, situations in which gas remaining in the electrolyte 20 expands rapidly in volume, causing the liquid to scatter, and air bubbles generated in the electrolyte 20 cause the electrolyte to overflow the battery container during injection of the electrolyte 20 into the battery case 12 from the liquid injection nozzle 46, can be prevented, leading to an improvement in the efficiency with which the electrolyte 20 is injected into the battery case 12.

In the embodiment described above, a predetermined amount of the electrolyte 20 is stored in the aeration tank 44 in the decompression chamber 2 in advance, and gas molecules dissolved in the electrolyte 20 are separated by exposing the electrolyte 20 stored in the aeration tank 44 to the atmosphere in the decompressed decompression chamber 2. However, the electrolyte 20 may be supplied to the aeration tank 44 from the feed pump 43 in parallel with injection of the electrolyte 20 into the battery case 12 by the liquid injection nozzle 46.

In this case, the feed pump 43 is operated at the time t4 when the door 21 of the decompression chamber 2 is closed or the time t5 when decompression begins, whereby supply of the electrolyte 20 from the storage tank 41 to the aeration tank 44 starts. As shown by a dotted line A in FIG. 8E, the electrolyte 20 is supplied from the storage tank 41 into the aeration tank 44 continuously at a substantially synchronous flow rate with the liquid injection amount through the liquid injection nozzle 46 until liquid injection through the liquid injection nozzle 46 is complete.

The electrolyte 20 in the pressurized condition obtained by adding the supply pressure of the feed pump 43 to the atmospheric pressure in the storage tank 41 is decompressed by being exposed to the decompressed atmosphere of the decompression chamber 2 in the aeration tank 44. Accordingly, the dissolved gas molecules in the electrolyte 20 expand to form air bubbles that are separated from the electrolyte 20. Therefore, with regard to separation of the dissolved gas molecules in the electrolyte 20, similar favorable effects to those of the embodiment described above can be obtained.

Figure 9:
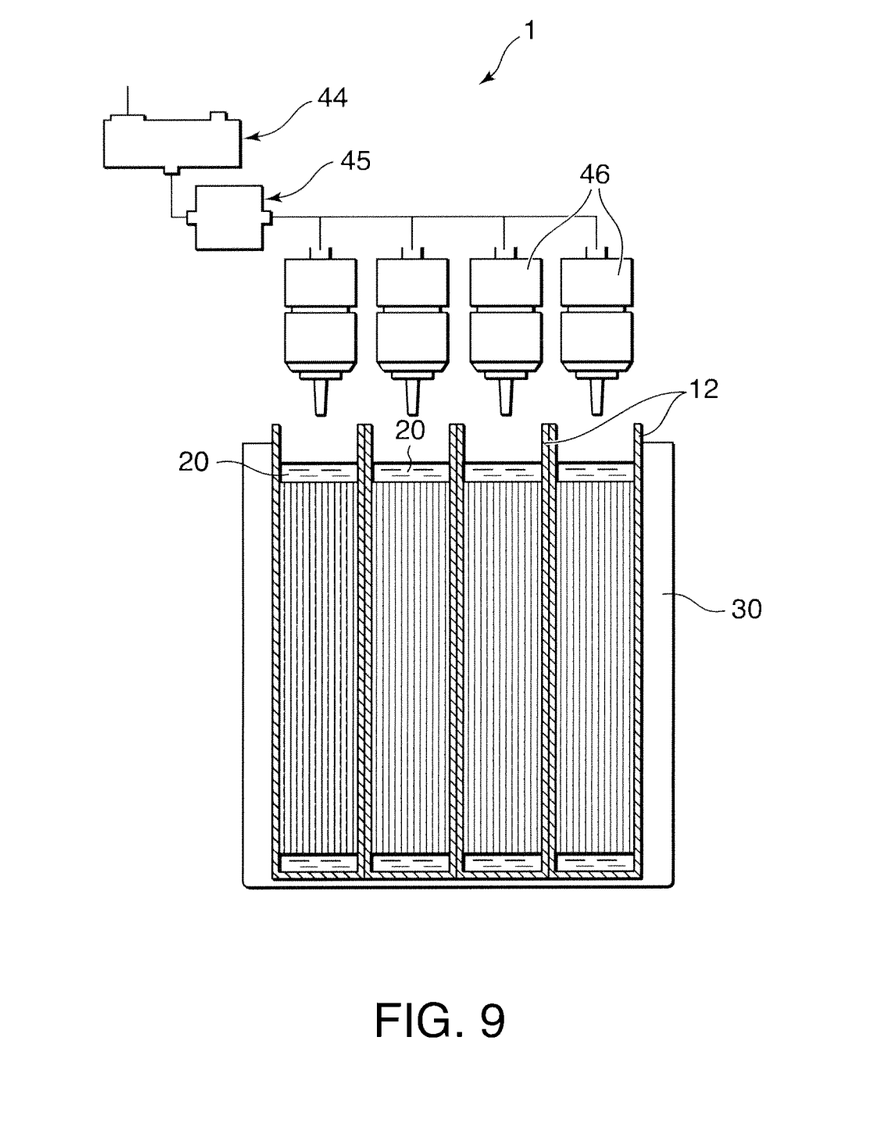
FIG. 9 is a schematic diagram of an electrolyte injection device according to another embodiment of this invention.

Referring to FIG. 9, another embodiment of this invention will be described.

In the electrolyte injection device 1 according to this embodiment, a single set of the aeration tank 44 and the degassing module 45 and a plurality of liquid injection nozzles 46 connected in parallel thereto are provided in the decompression chamber 2. A holding jig 30 holds an identical number of battery cases 12 to the number of liquid injection nozzles 46 such that the battery cases 12 are stacked in a horizontal direction. All of these devices are housed inside the decompression chamber 2 shown in FIG. 1. An outer configuration of the decompression chamber 2 is identical to that of the first embodiment.

By providing the plurality of liquid injection nozzles 46 in the decompression chamber 2 in this manner, the electrolyte 20 can be injected simultaneously into the plurality of battery cases 12, leading to a further improvement in operation efficiency. Instead of the holding jig 30, a plurality of similar holding jigs 3 to that of the first embodiment may be lined up. Furthermore, the electrolyte 20 may be injected into the plurality of battery cases 12 sequentially using a similar single liquid injection nozzle 46 to that of the first embodiment.

The contents of Tokugan 2010-88696, with a filing date of Apr. 7, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiments described above, this invention is applied to a device that injects an electrolyte into a lithium ion secondary battery, but this invention may also be applied to a device that injects an electrolyte into an electric double layer capacitor or an electrolytic capacitor.

Further, the aeration tank 44 does not necessarily have to be disposed in the decompression chamber 2. By connecting the opening portion 44a in the aeration tank 44 to the decompression chamber 2 via a pipe, the aeration tank 44 may be disposed on the outside of the decompression chamber 2.

INDUSTRIAL FIELD OF APPLICATION

As described above, this invention brings about a favorable effect in improving the efficiency of an operation to inject an electrolyte into a battery case, and may be applied to various battery structures.

The embodiments of this invention in which an exclusive property or privilege is claimed are defined as follows:

1. An electrolyte injection device for injecting an electrolyte into a battery case, comprising:
    a sealed decompression chamber;
    a liquid injection nozzle that injects the electrolyte into the battery case disposed in the decompression chamber;
    an aeration tank that exposes the electrolyte, which is supplied to the liquid injection nozzle, to a pressure in the decompression chamber; and
    a degassing module provided between the aeration tank and the liquid injection nozzle and including a gas permeable membrane configured to separate gas and liquid.

2. The electrolyte injection device as defined in claim 1, wherein the aeration tank comprises:
    an inflow port into which the electrolyte flows;
    an opening portion structured to face a gas phase above a liquid level of the electrolyte and that communicates with an atmosphere in the decompression chamber; and
    an outflow port structured to face a liquid phase of the electrolyte and that communicates with the degassing module.

3. The electrolyte injection device as defined in claim 1, wherein the decompression chamber comprises a door through which the battery case is movable into and out of the decompression chamber.

4. The electrolyte injection device as defined in claim 1, further comprising a plurality of liquid injection nozzles.

5. An electrolyte injection device for injecting an electrolyte into a battery case, comprising:
    a sealed decompression chamber;
    a liquid injection nozzle that injects the electrolyte into the battery case disposed in the decompression chamber;
    an aeration tank that exposes the electrolyte, which is supplied to the liquid injection nozzle, to a pressure in the decompression chamber; and
    a degassing module provided between the aeration tank and the liquid injection nozzle and including a gas permeable membrane configured to separate gas and liquid,
    wherein the aeration tank comprises
        an inflow port into which the electrolyte flows;
        an opening portion structured to face a gas phase above a liquid level of the electrolyte and that communicates with an atmosphere in the decompression chamber; and
        an outflow port structured to face a liquid phase of the electrolyte and that communicates with the degassing module, and
    wherein the aeration tank is disposed in the decompression chamber, and the electrolyte injection device further comprises a feed pump disposed on an outside of the decompression chamber to supply the electrolyte to the inflow port.

6. An electrolyte injection method for injecting an electrolyte into a battery case, comprising:
    sealing a decompression chamber;
    exposing, via an aeration tank, the electrolyte to a pressure in the decompression chamber;
    injecting the electrolyte in the aeration tank into the battery case disposed in the decompression chamber through a liquid injection nozzle; and
    separating the electrolyte into gas and liquid using a degassing module that is provided between the aeration tank and the liquid injection nozzle, the degassing module comprising a gas permeable membrane.

* * * * *